United States Patent
Kerpez et al.

(10) Patent No.: US 12,261,757 B2
(45) Date of Patent: Mar. 25, 2025

(54) SYSTEM AND METHOD FOR NETWORK AND COMPUTATION PERFORMANCE PROBING FOR EDGE COMPUTING

(71) Applicant: ASSIA SPE, LLC, Wilmington, DE (US)

(72) Inventors: Kenneth J. Kerpez, Long Valley, NJ (US); Peter Silverman, Evanston, IL (US)

(73) Assignee: ASSIA SPE, LLC, Redwood City, CA (US)

( * ) Notice: Subject to any disclaimer, the term of this patent is extended or adjusted under 35 U.S.C. 154(b) by 0 days.

(21) Appl. No.: 17/581,947

(22) Filed: Jan. 23, 2022

(65) Prior Publication Data

US 2022/0247651 A1    Aug. 4, 2022

Related U.S. Application Data

(60) Provisional application No. 63/143,193, filed on Jan. 29, 2021, provisional application No. 63/174,969, filed on Apr. 14, 2021.

(51) Int. Cl.
*H04L 47/78*    (2022.01)
*G06F 9/38*    (2018.01)
(Continued)

(52) U.S. Cl.
CPC ........ *H04L 43/065* (2013.01); *H04L 43/0817* (2013.01); *H04L 43/0864* (2013.01); *H04L 43/0888* (2013.01); *H04L 43/12* (2013.01)

(58) Field of Classification Search
CPC .............. H04L 43/065; H04L 43/0817; H04L 43/0864; H04L 43/0888; H04L 43/12; H04L 41/145; H04L 43/0876; H04L 43/106; H04L 43/50; H04L 41/142; H04L 41/16; H04L 43/0852; H04L 43/10;
(Continued)

(56) References Cited

U.S. PATENT DOCUMENTS 9,854,053 B1    12/2017    Joseph
10,021,175 B2    7/2018    Shattil
(Continued)

FOREIGN PATENT DOCUMENTS

WO    2020091736 A1    5/2020

OTHER PUBLICATIONS

Netscout, What is a Probe?, 2021, URL retrieved via: https://www.netscout.com/what-is/probe (Year: 2021).*
(Continued)

*Primary Examiner* — Schquita D Goodwin
(74) *Attorney, Agent, or Firm* — Michael North; North Weber & Baugh

(57) ABSTRACT

Described herein are systems and methods of for measuring and assuring performance in networked applications where edge computing is utilized, which may comprise determining or improving network and computational performance by the use of edge probing. Edge probing enables rapid measurement and assessment of networking and computational performance, where performance comprises speed latency, for a device using an edge compute node. Edge probing can be used to assess performance of and assign converged networking and computing infrastructure to applications and devices.

15 Claims, 8 Drawing Sheets

(51) Int. Cl.
*H04L 43/065* (2022.01)
*H04L 43/0817* (2022.01)
*H04L 43/0864* (2022.01)
*H04L 43/0888* (2022.01)
*H04L 43/12* (2022.01)
*H04W 72/04* (2023.01)

(58) Field of Classification Search
CPC . H04L 43/091; H04L 67/1008; H04L 67/101; H04L 67/1012; H04L 67/289
See application file for complete search history.

(56) References Cited

U.S. PATENT DOCUMENTS

| | | | | |
|---|---|---|---|---|
| 10,868,750 | B1* | 12/2020 | Yang | H04L 43/16 |
| 11,089,092 | B1* | 8/2021 | Seibel | H04L 67/101 |
| 11,190,419 | B1* | 11/2021 | Priescu | H04L 41/5019 |
| 11,194,628 | B2* | 12/2021 | Reyes | G06F 11/3433 |
| 11,395,195 | B2* | 7/2022 | Mishra | H04L 67/34 |
| 11,509,599 | B1* | 11/2022 | Nijim | G06F 9/45558 |
| 11,609,835 | B1* | 3/2023 | Varga | H04L 43/04 |
| 11,727,016 | B1* | 8/2023 | Agarwal | G06F 16/2428 |
| | | | | 707/769 |
| 2002/0177910 | A1* | 11/2002 | Quarterman | H04L 45/00 |
| | | | | 700/28 |
| 2008/0025223 | A1 | 1/2008 | Karacali-Akyamac et al. | |
| 2014/0247839 | A1* | 9/2014 | Kingsley | H04L 43/12 |
| | | | | 370/503 |
| 2018/0295049 | A1* | 10/2018 | Agarwal | H04L 43/08 |
| 2019/0229998 | A1* | 7/2019 | Cattoni | H04L 43/50 |
| 2020/0137148 | A1* | 4/2020 | Segal | H04L 43/12 |
| 2020/0142735 | A1* | 5/2020 | Maciocco | G06F 9/5038 |
| 2020/0287962 | A1* | 9/2020 | Mishra | H04L 43/065 |
| 2020/0344154 | A1* | 10/2020 | Ying | H04L 45/124 |
| 2021/0021484 | A1* | 1/2021 | Sood | G06F 9/5005 |
| 2021/0232498 | A1* | 7/2021 | Zhang | G06F 11/3608 |
| 2021/0409478 | A1* | 12/2021 | Choi | G06F 11/3692 |
| 2021/0409974 | A1* | 12/2021 | Zeng | G06N 20/00 |
| 2022/0150898 | A1* | 5/2022 | Jin | G06F 9/455 |
| 2022/0225065 | A1* | 7/2022 | Doken | H04L 41/5051 |
| 2022/0231952 | A1* | 7/2022 | Barton | H04L 43/062 |

OTHER PUBLICATIONS

International search report and the written opinion of the international searching authority mailed Apr. 15, 2022 in PCT application No. PCT/US22/13438, (8 pgs).

ETSI, "Multi-access Edge Computing", available from the Internet, <URL: https://www.etsi.org/technologies/multi-access-edge-computing>, (6pgs).

Al Morton, AT&T, TR-471, Maximum IP-Layer Capacity Metric, Related Metrics, and Measurements, Issue 1, Issue Date: Jul. 2020, Brodband Forum, Technical Report,. Available from the Internet, <URL https://www.broadband-forum.org/technical/download/TR-471.pdf>, (30 pgs).

Peter Thompson, "TR-452.1 Quality Attenuation Measurement Architecture and Requirements", Revision 1, Sep. 2020, Brodband Forum, Technical Report,. Available from the Internet, <URL: https://www.broadband-forum.org/download/TR-452.1.pdf>, (42 pgs).

Georgios Karagiannis, "TR-384 Cloud Central Office Reference Architectural Framework", Issue 1, Jan. 2018, Brodband Forum, Technical Report. Available from the Internet, <URL: https://www.broadband-forum.org/download/TR-384.pdf>, (80 pgs).

Extended European Search Report mailed Nov. 14, 2024 in European application No. 22746429.4, (11 pgs).

* cited by examiner

SYSTEM AND METHOD FOR NETWORK AND COMPUTATION PERFORMANCE PROBING FOR EDGE COMPUTING

CROSS-REFERENCE TO RELATED APPLICATIONS

This patent application claims priority benefit to the following co-pending and commonly-owned U.S. provisional patent applications: U.S. Pat. App. Ser. No. 63/143,193, filed on Jan. 29, 2021, entitled "SYSTEM AND METHOD FOR NETWORK AND COMPUTATION PERFORMANCE PROBING FOR EDGE COMPUTING," and listing Kenneth J. Kerpez, and Peter Silverman as inventors, and to the U.S. provisional Pat. App. Ser. 63/174,969, filed on Apr. 14, 2021, entitled "SYSTEM AND METHOD FOR NETWORK AND COMPUTATION PERFORMANCE PROBING FOR EDGE COMPUTING," and listing Kenneth J. Kerpez, and Peter Silverman as inventors. Each reference mentioned in this patent document is herein incorporated by reference in its entirety.

BACKGROUND

Technical Field

The subject matter described herein relates generally relates to the field of computers and communication systems and more specifically to methods, devices and systems for performance probing for edge computing.

Background

One skilled in the art will recognize the sensitivity of applications operating across today's complex and distributed systems to delay and latency. Many emerging applications require low delay, examples of which may be in the range of milliseconds or less. Additionally, the functionality supported by these applications may sometimes require reduced variation in this latency. Delay and latency may be introduced by a network supporting an application or by the computational processing supporting the application. Consider an application where data needs to traverse a network to a compute node, and the processed data then is returned to the original source over a network. There are networking delays in sending data to and receiving from a compute node. Further, there are delays due to processing performed at the compute node. In some instances, the sum of these delays may need to be below a threshold to meet the requirements of a low delay application. Oftentimes, the amount of delay may depend on the location of the compute node within a network.

Edge compute nodes may interface with other applications such as cloud computing systems, or control systems where the latency requirements may be less stringent. Edge computing can also support offloading of resource-intensive real-time processing, where the edge compute node performs the resource intensive processing enabling small, networked devices to access the larger computing power in the edge compute node. Applications that previously required significant embedded computing power can run on lightweight devices. Edge computing or Multi-access Edge Computing (MEC), ETSI—Multi-access Edge Computing—Standards for MEC, is a distributed computing architecture where computing takes place near the physical location where data is being collected and analyzed, rather than on a centralized server or in the cloud. It is called 'edge computing' since the site of the computations is located at the edge of the network.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
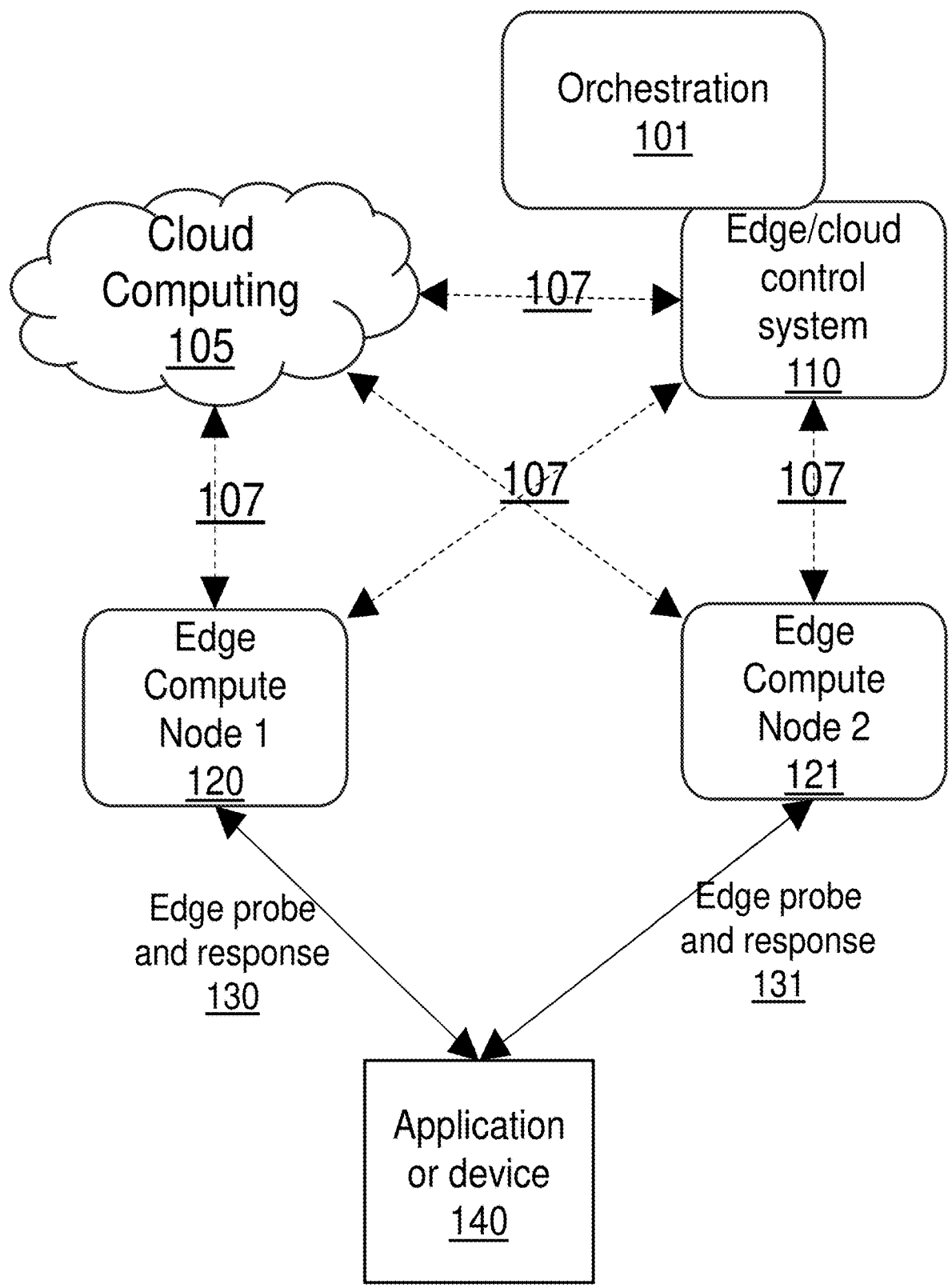
FIG. 1 shows an example edge probing architecture according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical components, circuits, devices and systems. The embodiments of the present invention may function in various different types of environments wherein edge probing is provided to improve performance. Furthermore, connections between components within the figures are not intended to be limited to direct connections. Rather, connections between these components may be modified, re-formatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment. Time information is an important aspect of performance information for measuring or improving edge computing performance. Time information comprises but is not limited to information that can be used to determine delay, jitter, computation time, network time, overall delay, overall latency, overall jitter, delay or jitter in a particular component of a system, computation speed or computation speed variation in the entire system or in any component of the system, network delay or network transport times, network transport jitter. Other examples of time information are well known to those skilled in the art. The means of determining time information include the use of time stamps, computation based on other information known to applications and processes, or time information can estimated. Examples of other performance information that is not related to time that may also be of use comprise but are not limited to measures of accuracy of a computation, metrics related to quality of experience (QoS) or quality of experience (QoE), determination of availability of a resource, stability of a resource, the ability to perform a particular computation, the capacity of a resource to handle one or more requests for service, or the reliability of a resource.

Time information may comprise one or both of either network time information, or edge node compute time information. Network time information relates to performance measures of the communication network supporting the edge computing environment and may comprise one or more of, but is not limited to, network delay, network jitter, and statistics on network delay variability over a time period. Other network time measures are well known to those skilled in the art. Edge node compute time information are performance measurements related to time that are due to computations that occur within the edge compute node. Edge node compute time information may comprise any one or more of, but is not limited to, time to perform a calculation, time to obtain a result, variability in compute time, and statistics related to variability in compute time over a time period. Time information may be derived in various embodiments using various combinations of network time information and edge node compute time information.

Embodiments of the invention provide edge computing being augmented by edge probing signals and mechanisms specific to edge computing. Edge probing determines and enables improvement in performance of the entire distributed system supported by the edge compute node.

The performance can be affected by network performance attributes, for example, time information that can include measures of latency, jitter, data loss or performance degradations for example, those related to retransmissions due to data loss. Performance can also be affected by computational attributes of the components of the system, for example, time information related to computation speed in the edge compute node and variation in response times due to data access, or to other computational attributes related to accuracy of the result of the computation. In certain scenarios, the sum of the effects of network and computational attributes determines if the entire system can meet its performance requirements. Edge probing provides a comprehensive method of testing the applicability and performance of a combined networking and computing infrastructure to allow joint determination of both the network and computational performance. Edge probing can ascertain network and computing performance for example speed, delays, response times, availability of resources, or accuracy of the results. Edge probing can also identify if an edge compute node has the capabilities to meet the applications requirements and is thus suitable to serve a particular application at a particular location. Edge probing can use measurements enabled by the edge probe to select an optimal edge node or nodes to serve the application based upon the performance requirements of the application. Edge probing can improve the compliance of the system to meet its stated speed and quality of computation requirements.

An edge compute node has at least one computing system and at least one network interface and further comprises at least one receiver that can receive edge probes over one or more of the at least one network interfaces and at least one transmitter that can transmit edge probe responses over one or more of the at least one network interfaces. The computing system can be a computer, server, data center, edge computing system, cloud computing platform, bare metal, virtual computing system, virtual machine, container or a combination of these or other systems known to one of skill in the art. The computing system may be in a single blade, box, server, rack, data center, distributed across machines, virtualized on physical hardware, virtual infrastructure, Cloud CO, edge computing, cloud computing, or fog computing or other devices. In certain embodiments, the computing system can be virtualized and can be spread across various physical hardware and can interwork with cloud computing or fog computing.

The one or more interfaces to the network communicatively couple to the computing infrastructure, controllers, or orchestrators and to the applications and applications and devices within the edge; that is devices and applications in proximity to the edge compute node. A single network interface can support communication both 'northbound', (e.g., toward the cloud) and 'southbound', (e.g., toward the application and device supported by the edge compute node), or separate interfaces to networks for southbound and northbound support the communicative coupling.

Edge computing can be private, with the edge compute nodes administered by a company for their own use or to provide their own service. Edge computing may also be a hosted service used by many entities and provide a pervasive computing infrastructure embedded in the network. Edge computing can also be woven into the network, so that networking and computing become intertwined. As edge computing and networking merge, there is a need to jointly probe, test, and ascertain the performance of this merger.

An edge probe may specify (or define, or request, otherwise indicate) one or more edge computing tests for an edge compute node. The edge probe may specify one or more edge computing tests by way of an indication sent within the edge probe that instructs the edge compute node receiving the edge probe to perform one or more test computations. A test computation typically determines (or enables the determination of) performance information for (or at) the edge computing node. In this way it will be appreciated that an edge computing test may comprise (or otherwise specify) one or more test computations performed by an edge computing node. The results of the one or more edge computing tests may be returned in the response sent from the edge compute node in response to a received edge probe. The test computations requested in the edge computing test may comprise any one or more, but are not limited to, of determinations or estimates of performance information related to the requested edge computing test, measurements or estimates of availability of computational capacity to perform the requested edge computing test, measurements or estimates of the ability of the edge compute node to perform the requested edge computing test, availability of electrical power to perform the requested edge computing test, measurements or estimates of the accuracy of the results of the requested edge compute test, or availability of the functionality on the edge compute node to perform the edge computing test. Those skilled in the art will recognize other computations of that could be requested in an edge compute test contained within an edge probe.

The indication within the edge compute probe that specifies an edge computing test may comprise any one or more but is not limited to a code, an identifier, a label, a number, a character, or string specifying a particular test or computation already known the edge compute node. Additionally, or alternatively the edge probe may specify all or part of a edge computing test by comprising the details of the test computation to be performed by the edge compute node and/or code to be executed by the edge compute node. In this way in some examples the edge compute probe may be considered to comprise all or part of the edge computing test. The edge computing test may comprise (or specify) computations to be performed at an edge compute node that are typical of a computation performed by an edge compute node during its normal operations. In particular the edge compute probe may specify as part of the edge computing test information or data required to perform said typical computations.

FIG. 1 shows a simple example of an edge probing architecture according to various embodiments of the invention. An edge probe signal and response 130 flows between an application or device 140 and edge compute node 1 120. Another edge probe signal and response 131 flow between the application or device 130 and edge compute node 2 121. In addition, probes and responses, as well as related messaging 107 is optionally transmitted among edge compute node 1 120, edge compute node 2 121, cloud computing 105, and an edge/cloud control system 110 which may perform orchestration 101. In the architecture illustrated in FIG. 1, there can be a plurality of edge compute nodes 120, 121 each of which is probed by the application or device 130.

Edge Probing Test

Figure 2:
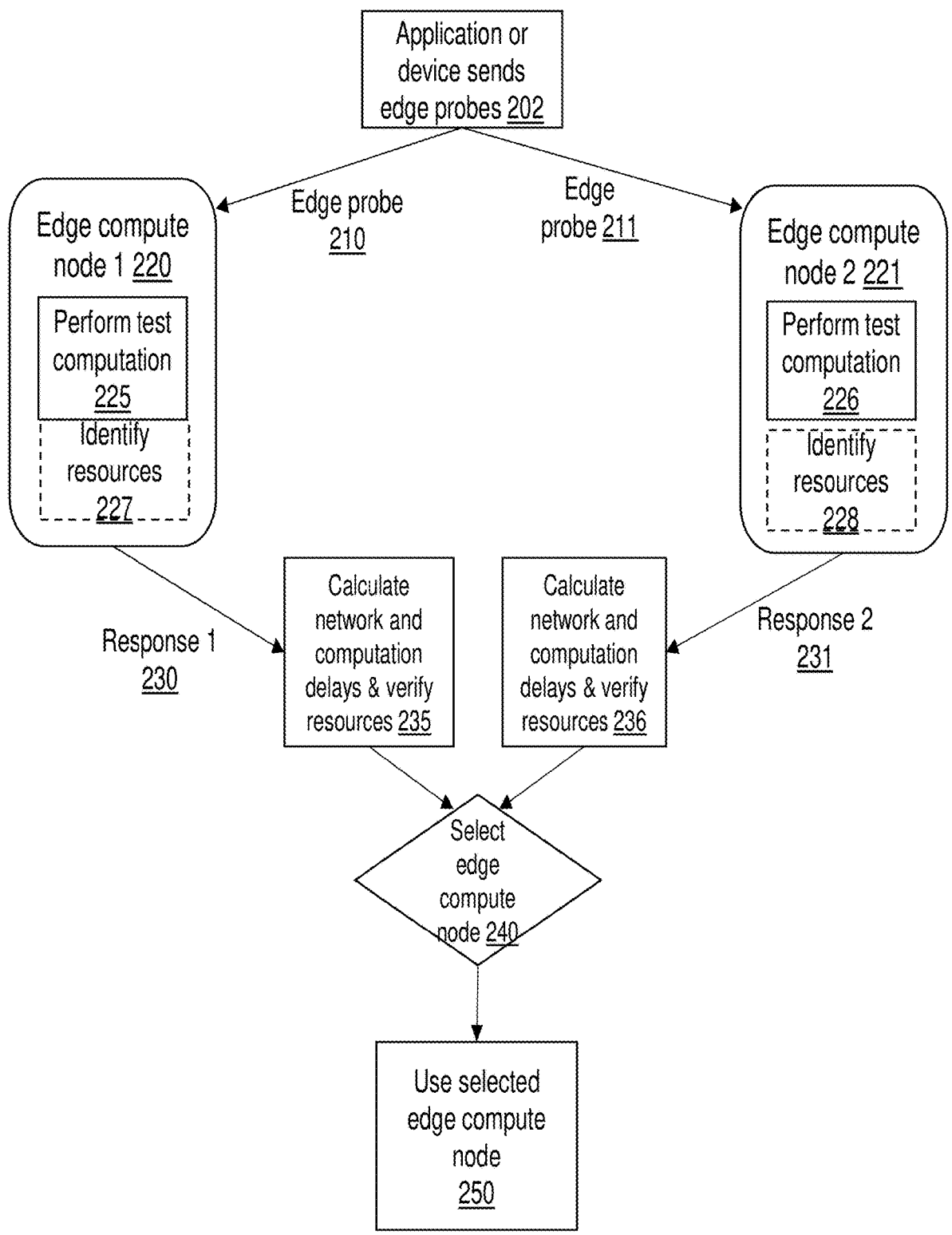
FIG. 2 shows a flowchart of edge probing controlled by an application according to various embodiments of the invention.

FIG. 2 illustrates one embodiment of this invention where an edge probing is implemented in the application or device using edge computing 201 according to various embodiments of the invention. In one example, the application or device 201 supports a functionality that implements an edge computing probe 202. The application or device 202 sends one or more messages or test signals which comprise the edge probe 210, 211, the edge probe indicating (or requesting, or otherwise specifying) one or more edge computing tests to the plurality of edge compute nodes 220, 221. The messages or data sent as an edge probe 210, 211 may be messages or data specifically selected to support an edge probe 210, 211 or may be messages or data typically used to support the functionality of the edge compute application.

The edge compute node then either performs the computation requested by the edge computing test 225, 226 as instructed by the probe and/or determines time information as an estimate of computing time and the resources required to satisfy functionality requested by the one or more edge computing tests of the edge probe 227, 228. The edge computing test 225, 226 offers an exemplary method for measuring time information as the computation time depending on the edge compute node. The test computation performed as part of the edge computing test 225, 226 may be identical on all compute nodes 220, 221 or may be specific to the applications on a particular node 220, 221. Similarly, the resources required by a particular edge compute node 220, 221 to respond to the probe may be identical or different on different edge compute nodes 220, 221 depending on differences in the applications on that particular node 220, 221. In certain embodiments, edge compute node 220, 221 can implement a specific functionality to respond to an edge probe and the one or more edge computing tests of the edge probe 210, 211. In other embodiments, the edge compute node 220, 221 can implement a functionality used for other purposes. For example, messages exchanged during operation of an edge computing architecture can be used as the edge probe 210, 211. These messages may be processed by the edge compute node 220, 221 using the same or similar functionality as used for the messages typically exchanged during operation of the application.

The edge compute node then returns a response 230, 231 to the one or more edge computing tests within the received edge compute node. In one example, the timing of the receipt of response by the application using the edge computing 201 can indicate time information related to how quickly tasks can be performed by that edge compute node in response to the edge computing test of in the edge probe including the times required to traverse the network supporting the edge compute application 235. In another example, the response 230, 231 can return performance results of a edge computing test that provides time information. The response 230, 231 can also include related useful information regarding the capabilities of the edge compute node 220, 221 such as supported resources, supported applications and computation types, current utilization, or projected future utilization. One skilled in the art will recognize that the two examples may be implemented together over time to provide time information data regarding both computational delay and network latency for one or more edge compute nodes. Test computation and results can include speed and efficacy of the one or more specified edge computing tests. Efficacy can include determinations of accuracy, access to data from other systems, or variability of results at different times.

In accordance with various embodiments, specific edge computing tests can be requested by the probe 210, 211, or a plurality of probes 210, 211 can be sent to determine the processing capabilities of the of the compute node 220, 221. These processes provide information about the effect of network variation over time at the compute node 220, 221, which may support various applications or react differently to varying loads or operating conditions. The edge compute nodes 220, 221 may or may not support different applications, for example one node may support applications such as graphics processing or search matching while another may not, or the capabilities support may differ. The response 230, 231 may provide information about these application capabilities 227, 228 on the compute node 220, 221 as well as performance information related to speed or variability in response time. The edge computing test requested by the probe 225, 226 can be designed to provide uniformly consistent computing times that enable comparisons between performances of different compute nodes.

The sending and receiving of the edge probe 210, 211, 230, 231 can further be used to provide estimates of time information related to network speed, network latency, computing speed, computing latency, and also error rates, and can be further used to provide figures of merit for the usefulness of the support of applications such as Quality of Experience (QoE) or Quality of Service (QoS). The sending and receiving times of the probe can be recorded, or the probe 210, 211 or the response 230, 231 can contain a timestamp which can be used to derive time information. These times can be compared to determine round-trip time or latency for the network as well as computation times of functionalities the edge compute node 220, 221 all of which are examples of time information. In certain instances, the round-trip time can be estimated by subtracting the received timestamp from the time that the response arrives. In other instances, the round-trip time can be estimated by subtracting a recorded time at which the edge probe was transmitted from the time that the response arrives. A correlation tag can be included in each edge probe and response so that the transmitted probe can be identified in the received response. In certain embodiments, timestamps can be further appended at the input 210, 211 and output of the edge compute node 230, 231 to sectionalize the time used to transmit to the edge compute node, the time the edge compute node uses for processing, and/or the time to transmit from the edge compute node.

Similar timestamps can also be appended at intermediate network locations and used to estimate per-segment time or latency which are examples of time information related to the segments. These times can in some cases be estimated using a network test such as a ping. The networking time estimated from edge probing can be improved by a network test and such network test may be utilized as a component of the edge probe 210, 211 or its response 230, 231.

FIG. 2 shows edge probing originating from an application (201) in accordance with various embodiments of the invention. The application or device sends edge probes 210, 211 to edge compute node 1 220 and to edge compute node 2 221. Edge compute node 1 220 performs one or more particular test computations as specified in the one or more edge computing tests specified by the edge probe 225, then after the specified calculations are performed, edge node 1 220 sends response 1 230 back to the application 201. In certain examples, edge compute node 1 220 can also append other useful information to response 1 227, such as resources, computing capabilities, and utilization. In other examples, this information can be sent in another message 230. Similarly, edge compute node 2 221 also performs one or more particular test computations of the one or more edge computing tests, then after the specified calculations are performed, edge compute node 2 221 sends response 2 231 back to the application, and that response may also include other useful time information and other performance information of interest 228. One skilled in the art will recognize various modifications are supported by embodiments of the invention such as instead of actually performing a test computation 225, 226, the edge compute node estimates the time needed for such a computation or the speed at which such computations can be performed 225, 226 and includes that estimate in the response 230, 231. The delay, speed and other performance information is then calculated for edge compute node 1 235, and for edge compute node 2 and edge compute node 1 and/or edge compute node 2 is verified to be suitable for the application 240.

Another variation relates to the calculation 235 substituting or adding a network test to estimate delay due to networking. Similarly, the delay, speed and other time information or other performance information is then calculated for edge compute node 2, 236 and edge compute node 2 221 is verified to be suitable for the application. Finally, the application compares the results of the edge probing from edge compute node 1 and from edge compute node 2, and then selects 240 which edge compute node to use 250. The edge probe 210,211 the test calculation requested by the one or more edge computing tests of the edge probe 225, 226, identifying resources 227, 228 and the response 230,_231 may utilize messages, algorithms, functionality, or applications specific to edge probing, or may utilize messages, algorithms, functionality, or applications utilized for other purposes, including those used typically to meet the requirements of the edge computing applications, or for other management purposes such network ping messages or timestamps.

Figure 2B:
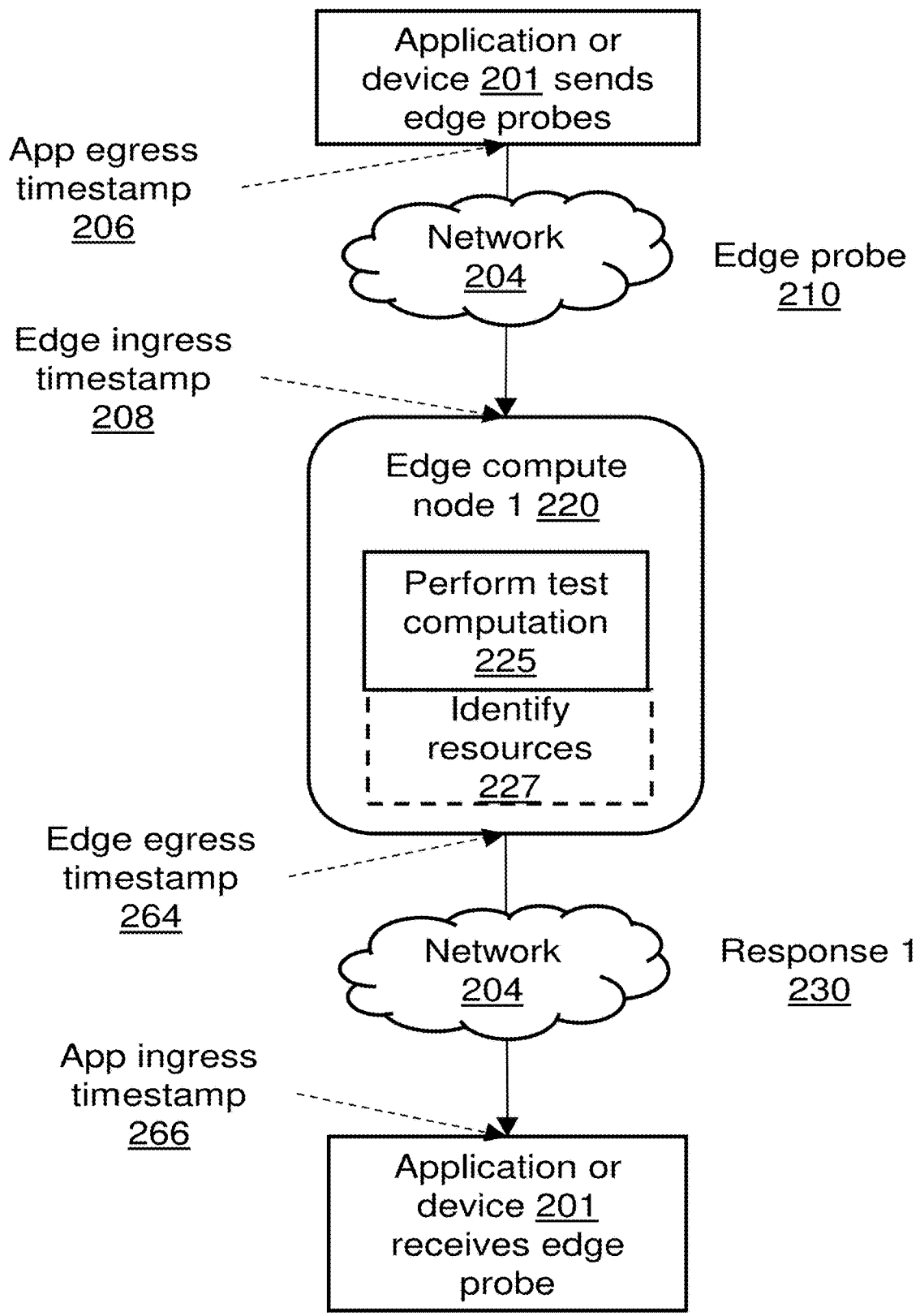
FIG. 2b illustrates examples of where timestamps could be inserted in an edge probe according to various embodiments of the invention.
Figure 2C:
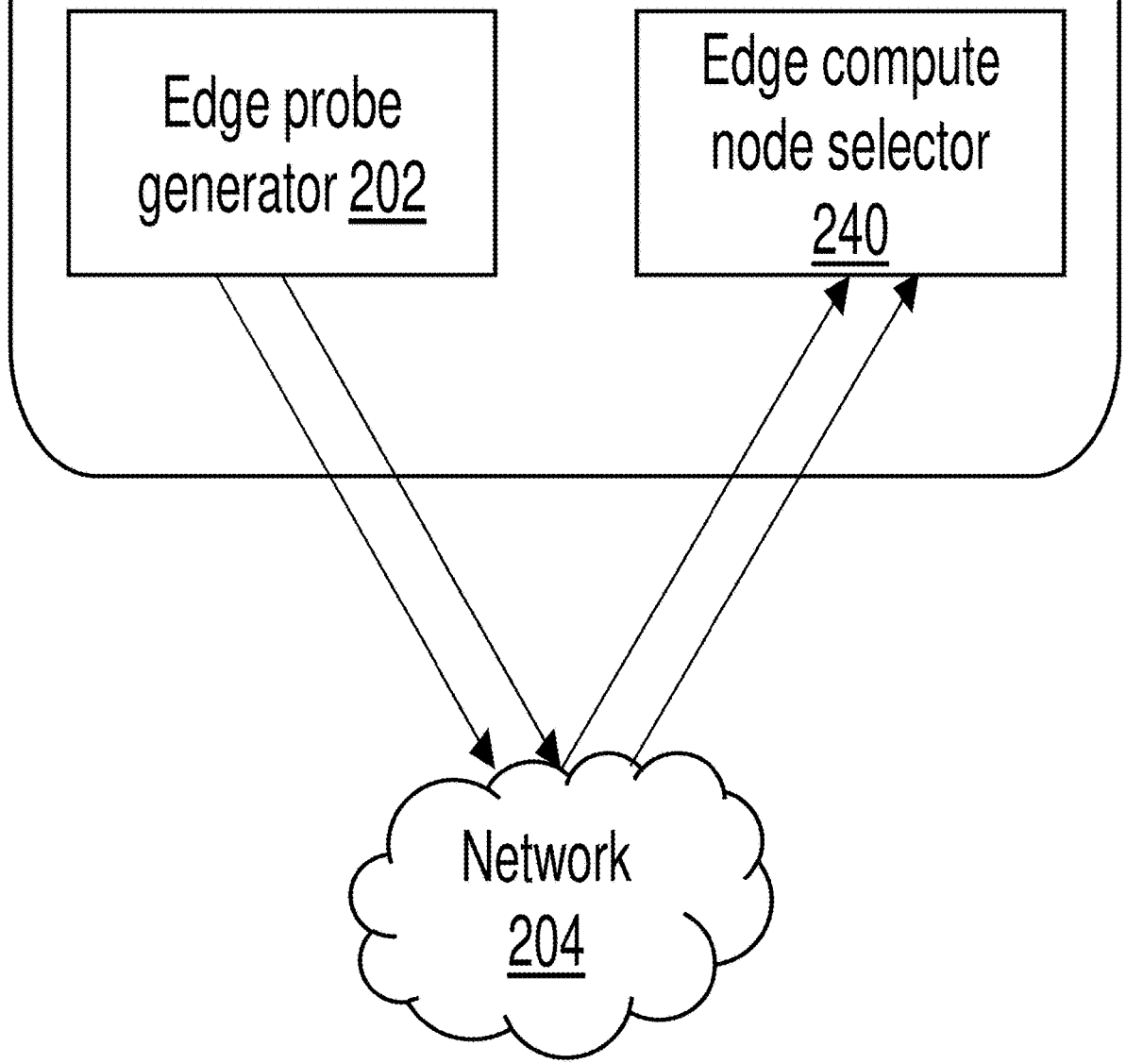
FIG. 2c shows elements related to an application generating and receiving edge probes.

FIG. 2c illustrates an exemplary structure of devices and applications supporting edge probes 201. The device or application 201 comprises an edge probe generator 202 that transmits edge probes over one or more interfaces to a network 204 with a transmitter, and an edge compute node selector 240 that receives the response to the edge probe from the network 204 with a receiver and processes the response to the edge probe taking an action based upon the response. The action may comprise any one or more of selection of one of a plurality of edge compute nodes for use by the distributed application, sending a message to a management system, orchestrator, or human operator, sending a message to the edge compute node the message instructing the edge compute node to take an action, sending a message to another application or device in the cloud. Those skilled in the art will recognize other possible actions can be taken by the edge compute node selector in response to the received edge probe response.

Example embodiments show real-time selection of edge probing test depending on the application:

A. An application requires analyses of a video stream to recognize certain objects. An example would be determining if moving objects are motorized vehicles, pedestrians, bicyclists, or animals. In this example the analysis could be performed by an edge compute node and the application can use the edge probe specifying one or more appropriate edge computing tests to select the appropriate edge compute node from a plurality of possible edge compute nodes. As seen in FIG. 2, the application 201 sends a test video stream within in edge probes 210, 211 to edge compute nodes 1 and 2 220, 221, and requests object recognition of a video stream as the test computation requested in the edge computing test. The responses to the edge probe 230, 231 are timed to provide time information, and can also be analyzed to determine the whether the object analysis is accurate and correctly identifies the object. The edge probe, test computation, and response can occur in less than a few seconds, enabling real-time selection of the edge compute node by the application.

B. In another example of an edge probe, an application sends a cryptographic key to one or more of the plurality of edge compute nodes. In this example, the probe specifies an edge computing test comprising a request for three edge compute node(s) to factor the cryptography key as the test computation.

C. In some embodiments, the application sends a plurality of requests for edge computing tests in a single edge probe. The requested test computations may be identical and in such cases the response to the edge probe could be used by the application to determine the capacity of the edge compute node to handle multiple requests, or the edge computing tests could be of varying types and the application could determine from the edge probe responses the capabilities of the edge compute node to address various types of computations.

D. In another embodiment, an application sends a request for an edge computing test to the compute node in the edge probe where the edge compute node already has an accurate estimate of how long it takes to perform this test computation, and returns this estimate of time information without needing to perform the calculation.

E. In another embodiment, the application sends an edge computing test for the edge compute node to perform a well-known computation, for example computing the first 1000 prime numbers. The compute node already has an accurate estimate of how long it takes to perform this well-known computation, and just returns this estimate without performing the calculation.

F. In some embodiments, the possible computations or calculations used in the probes could be known beforehand by both the application and the edge compute node. In such cases, the edge computing test of the probe could be a request to perform a particular computation or provide an estimate as indicated by a code indicating a particular test to be performed. For example, the probe comprises a request to 'perform test 101' or the code '101' where 'test 101' is to provide a particular estimate (e.g., calculate the first 100 prime numbers) while 'test 102' or '102' might be another class of computation (e.g., 'analyze a sample video stream for pedestrian images').

It is possible in embodiments of the edge probe that no edge compute node may be able to perform a particular requested test. This information can be used by the application to further manage the distributed system and computational processes therein. Examples of actions that could be taken by the application in case of such failures may comprise any one or more of but are not limited to, indicating a failure situation to another device, operator, or management system, choosing an edge compute node based upon other criteria, using cloud computing, or sending a message to one or more of the edge compute nodes to reconfigure themselves. Examples of such reconfiguration include requesting new software be installed from a server, or establishing communications with another computing device in the cloud. Another possible action by the application in response to all edge probes indicating failure to comply with the request in the probe could be for the application to halt its own processing for a period and notify an operator or management system of the failure situation, until an edge node with the appropriate capabilities is available. Ultimate availability of a compliant edge compute node could be determined by further edge probes from the application.

Figure 3:
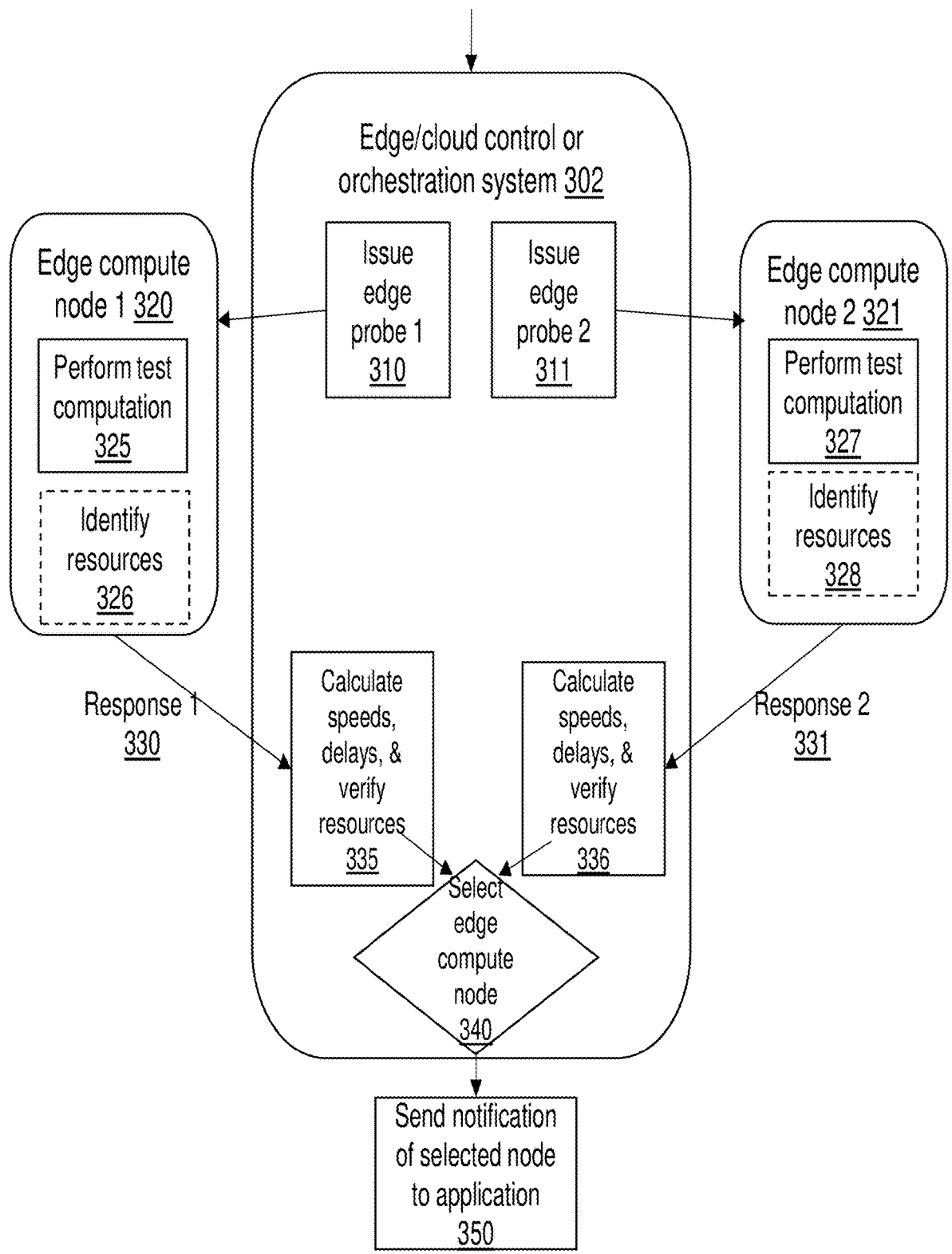
FIG. 3 shows a flowchart of edge probing controlled by a control or orchestration system according to various embodiments of the invention.

FIG. 3 illustrates edge probing being controlled by an external system such as a management, control or orchestration system according to various embodiments of the invention. The application requests service 301, then the edge/cloud control or orchestration system 302 requests that edge probes be sent to edge compute node 1 310 and to edge compute node 2 311. Edge compute node 1 320 performs a particular test computation 325 as instructed by the one or more edge computing tests indicated by the edge probe, then after that calculation is performed edge node 1 sends response 1 330 back to the application. In one example, edge compute node 1 320 can also append other useful information to response 1 326, such as computing resources, capabilities, and utilization. In another example, this information can be sent in another message 330. Similarly, edge compute node 2 321 may also perform a particular test computation 327 as instructed by the one or more edge computing tests indicated by the edge probe, then after that calculation is performed, edge compute node 2 sends response 2 331 back to the application, which response may also include other useful information 328.

The edge probe 310, 311, the test calculation 325, 327, identifying resources 326, 328 and the response 330, 331 may utilize messages, algorithms, functionality, or applications specific to edge probing, or may utilize messages, algorithms, functionality, or applications utilized for other purposes, including those used typically to meet the requirements of the edge computing applications, or for other management purposes such network ping messages or timestamps.

In certain embodiments, instead of performing a test computation (325, 327), the edge compute node 320, 321 estimates the time needed for such a computation or the speed at which such computations can be performed and includes that estimate in the response 330, 331. In yet other embodiments, a network test is substituted or added to estimate delay due to networking. The delay, speed and other time information or performance information is then calculated 335 for edge compute node 1 320, and edge compute node 1 320 is verified to be suitable for the application 335. Similarly, the delay, speed and other time information or performance information is then calculated 336 for edge compute node 2 321, and edge compute node 2 321 is verified to be suitable for the application 336. Finally, the edge/cloud control or orchestration system compares the results of the edge probing from edge compute node 1 320 and from edge compute node 2 321, and then selects which edge compute node to use 340. In various embodiments, the edge/cloud control or orchestration system 302 can coordinate edge computing assignments across many applications 350 and many edge compute nodes 320, 321; and can also input data from external operations systems such as resource assignment systems and service assignment systems.

Test Computations

In embodiments, the test computation 225, 226, 325, 327 as requested in the one or more edge computing tests of an edge probe can provide an estimate of the computation speed, or the time it takes to perform a computing task, at a particular edge compute node 220, 221, 320, 321, these comprising time information. In certain instances, the test computation 225, 226, 325, 327 can perform a typical computer benchmarking test, such as a SPECint test. The test computation can be a calculation such as running an encryption/decryption algorithm on a particular string, or it may interact with graphics and memory such as running a compression algorithm on a particular image sequence. The test computation can evaluate a particular type of performance, such as a memory intensive task or a processing intensive task. The test computation can evaluate a particular application for example comprising but not limited to any one or more of graphics processing, recognition, compression, image analyses, etc. The test computation can evaluate CPU speed, graphics processing unit (GPU) speed, memory speed, memory size or other performance indicators. One skilled in the art will recognize that various test computations can be applied to all computing tasks or shared-tasks that may be implemented within an edge node.

The duration of the test computation can be timed, or its duration estimated in accordance with various embodiments. In yet other embodiments, the test computation can be output with response immediately returned across the network, so the computation and networking delay are both part of the round-trip delay from sending the probe until receiving the response thus enabling the derivation of time information.

FIG. 2*b* shows an example embodiment of the use of timestamp points in edge probes and their responses. Timestamps are appended to edge probes or edge probe responses at these points in the network or in the edge compute node. In this embodiment, the first timestamp 206 is appended by the application or device 201 and is the time at which the edge probe 210 exits the device. A second timestamp 208 is appended by the edge compute node 220 and is the time at which edge probe 210 enters the edge compute node 220. A third timestamp 264 is appended by the edge compute node 220 and is the time at which the response 230 exits the edge compute node 220. A fourth timestamp 266 is appended by the application or device 201 and is the time at which the edge probe response 230 enters the device 201.

Time information concerning the total networking plus computation time can be determined by subtracting timestamp 206 from timestamp 266, this can be accurate since the same device 201 normally both sends the probe and receives the response, so timestamps 206 and 266 are generated by the same clock in the device. In certain embodiments, timestamps 208 and 264 can be omitted. Alternatively, the time information related to the total networking plus computation time can be determined within the device by subtracting the recorded sending time of an edge probe from the time that the corresponding response is received.

The time information related to computation time can be determined, at the application or device 201 by subtracting timestamp 208 from timestamp 264, this can be accurate since both these timestamps can be generated by the same clock in edge compute node 220, 221. Alternatively, the computation time can be determined within the edge compute node 220, 221 and the value included in the response to the edge probe 230, 231.

The time information related to the time to traverse the network can be estimated by sending one or more pings from point 206 to point 208. In some examples, network 204 is the same as network 203, and so the ping will traverse both networks, out and back. The computation time in the edge node can be estimated by subtracting this ping time from the total networking plus computation time which may be determined; examples of which are described above.

In certain embodiments there can also be additional timestamp points internal to the network or internal to the compute node. Additional computation or networking times can be determined by a differences between such additional timestamps.

The test computation may implement a functionality specific to evaluation of performance or it may reuse a functionality used in the ordinary operation of the system. One skilled in the art will recognize that other functions, such as the addition of a timestamp to a message, might be added to the typical functionality implemented.

Multiple probes 210, 211, 310, 311 can be issued to further enhance performance estimates through a process such as averaging the multiple results in accordance with various embodiments of the invention. The multiple probes can also be used to estimate variations in the computation and network performance both time information and other performance information, including estimates of variation of in jitter and data loss. Some applications, such as industrial automation, require time information related to deterministic delays or deterministically bounded delay. For these applications, it is important to measure and strictly bound the network plus computation delay, and a series of edge probes can be used by applications to determine, using statistical analysis, if the measured performance meets the application requirements, and to enable selection of edge compute nodes that will meet these deterministic requirements.

Multiple probes can be sent, and their responses collectively analyzed to estimate statistics and their underlying probability distribution. As an example embodiment, a series of 20 edge probes and 20 responses, all performing the same test computation, which result in the following 20 values for compute time, in milliseconds:

369, 337, 377, 354, 384, 417, 351, 355, 414, 343, 346, 331, 376, 379, 382, 400, 366, 410, 368, 401.

These data have the following statistics:

| | |
|---|---|
| mean | 373.0 |
| standard deviation | 25.9 |
| max | 417 |
| min | 331 |

Figure 5:
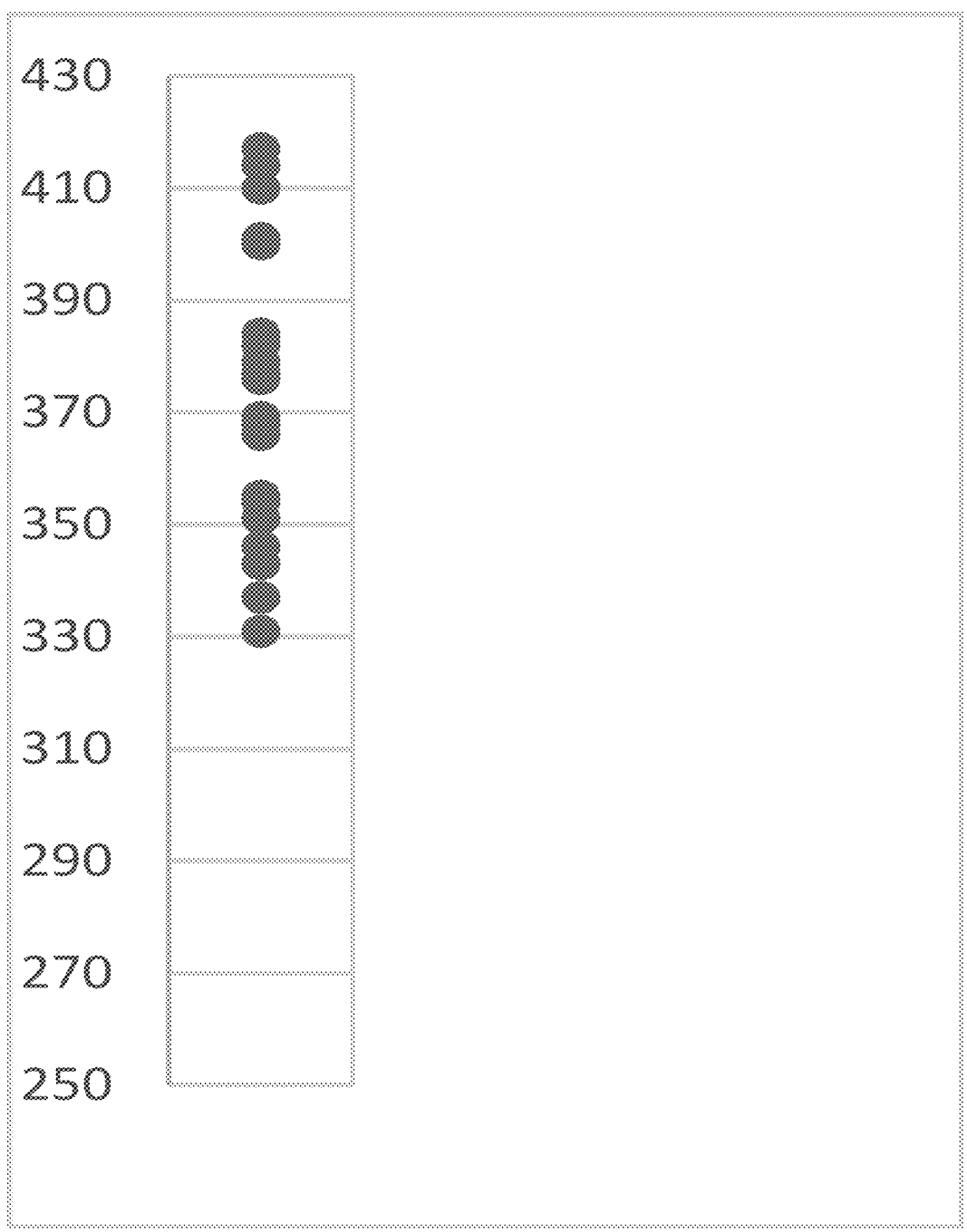
FIG. 5 shows an example plot of multiple computing times according to various embodiments of the invention.

The mean value can be used as a more accurate estimate than any single value. The max, min, and standard deviation show the variability of the responses. A plot of these computing times is shown in FIG. 5. Performing further analyses, it is estimated that the underlying probability of the computing time is uniformly distributed from 330 to 420 milliseconds, inclusive.

Edge probes can be sent out at different hours during the day and in embodiments statistical analysis could be performed taking into account time of day, day of week, or other time periods to ascertain time varying relationships to performance of the edge compute node. Such statistical analysis of time information or other performance information including the correlation of time information with other performance information can be used for edge node selection by time of day, and also for traffic engineering of the entire distributed system and especially the edge compute node, and planning deployment of edge nodes based on demand or expected growth in transaction traffic. For example, such data can indicate that more edge compute nodes should be added.

Edge Probing Responses

As described above relative to embodiments of the invention, an edge probe response 230, 231, 330, 331 can provide time information comprising speed and latency indicators for the edge compute node and the networks that support access to it. Additionally, the edge probe response 230, 231, 330, 331 could provide other performance information may comprise any one or more of indications of the accuracy, completeness, availability, or the ability of the edge compute node to perform a requestion functionality. A probe response 230, 231, 330, 331 may comprise any one or more of a measure of processing, memory, networking capabilities and other measurements known to one of skill in the art. Measurements that may comprise any one or more of Speed, latency, jitter, loss, availability, reliability, repeatability, throughput, scalability, privacy, security, or efficiency can be estimated for networking and for computation, and for the combination of both networking and computation. Timestamps can be provided in the probe response 230, 231, 330, 331 to facilitate and sectionalize such network related measurements. Further, the edge compute node 220, 221, 320, 321 can include information in the probe response about its capabilities, applications supported, supported operating systems, software support, availability, current processing load, and future scheduled or anticipated load.

An example embodiment of comprising an edge probe response is shown below:

| | |
|---|---|
| Correlation tag | 042819 |
| Originating timestamp | May 28 14:34:08.914 EDT 2020 |
| Entering timestamp | May 28 14:34:08.954 EDT 2020 |
| Exiting timestamp | May 28 14:34:09.982 EDT 2020 |
| Timed computation | Graphics processing test |

| | |
|---|---|
| Estimated computing time (milliseconds) | 409.1 |
| Estimated computing time standard deviation (milliseconds) | 21.9 |
| Can requested applications be supported | yes |
| Are requested compute resources available? | yes |
| Estimated duration of availability (seconds) | unlimited |
| Queue time until processing starts (milliseconds) | 0.0 |
| Other pending jobs | none |
| Available CPU | Core1 91%<br>Core2 46%<br>Core3 100%<br>Core4 100% |
| Available Graphical Processing Unit (GPU) | Core1 0%<br>Core2 100% |
| Total available memory (MByte) | 6921.7 |
| Total available disk (GByte) | 109.8 |
| Available disk speed (Mbyte/sec) | 209 |
| Available network (Mbps) | 1000 |
| Percent uptime (availability) | 99.8% |
| Supported operating systems | Windows 10, Ubuntu 20.04.2.0 LTS, CentOS 7 |
| Supported compilers | C, C++, Python 3.9.1, Java ™ Standard Edition 6 |
| Supported network stacks | IPv4, IPv6, Ethernet |
| Supported plug-ins | Math.h, maps, convolution neural network, MySQL database, translate |

The correlation tag in the above example is an identifier that associates a response with the originating edge probe. Note that the reported computing resources in this example embodiment can be available on hardware, on a virtual machine(s), or on container(s). There may be fewer or more elements in an edge probe response than are shown in this example as the edge probe response may comprise any one or none of the above elements.

For many emerging applications such as industrial automation, edge compute nodes may have determinism and reliability issues. Multicore central processing units (CPUs) share some resources and may not ensure Quality of Service (QoS) per core; however, coordinated computing can be time sensitive to ensure sufficiently deterministic computing times. Edge probing results can be used to model edge compute performance as statistics such as average or variance, or compute performance can be modelled as a random variable. Edge probing can determine computing speed/time, determinacy/repeatability (using multiple probing tests), scalability, throughput, CPU, graphics (GPU), memory, disk, and network (virtual and physical) performance.

In various embodiments, edge probing can derive time information by invoking a User-Datagram Protocol (UDP) speed test, as defined in Broadband Forum TR-471, Maximum IP-Layer Capacity Metric, Related Metrics, and Measurements, 2020 to determine network speed. The UDP speed test can identify network performance and sectionalize to find bottlenecks. One skilled in the art will recognize that other standardized processes may be used as a component within edge probing across embodiments of the invention.

The probe response can be used to provide time information by estimating latency and latency variation, such as the Quality of Experience Delivered (QED) defined in Broadband Forum TR-452.1, Quality Attenuation Measurement Architecture and Requirements, 2020. QED defines three network performance and latency components: Delta Q|G (Geographic network), Delta Q|S (Serialization network) and Delta Q|V (Variable network). In some embodiments, edge probing can be incorporated into QED by adding a fourth element, called Delta Q|C (Computation) which represents statistical computing delay similar to the existing Delta Q components. The overall QED or Delta Q of a path is characterized by the Delta Q [G, S, V, C] tuple. The Delta Q|C distribution is that part of Delta Q that is a function of computation time and delay and incorporates things like computation scheduling and time to perform computation. Delta Q|C is a function of the complexity of the test computation and the abilities of the edge compute node. Delta Q|C can be measured by edge probing, and can be isolated from the networking Delta Q due to [G, S, V] by subtracting the networking Delta Q from the overall Delta Q. Delta Q|C can be modeled by simple statistics such as average or variance, or can be modelled as a random variable, whose distribution may vary by time of day etc.

UDP speed tests and QED can both be run as an edge computing test specified in an edge probe or as a component of an edge probe and their edge probing results can be utilized in the evaluations of the edge probe results 235, 236, 335, 336.

The messages utilized in edge probes 210, 211, 310, 311 or in the responses 230, 231, 330, 331 could be messages based on existing standards, for example a network ping, or be messages specific to a particular application. Similarly, the computations could be based on existing tools and algorithms or those specific to the application.

Standardized probing interfaces, messaging, and tools and algorithms could be developed to support edge probing.

Figure 4:
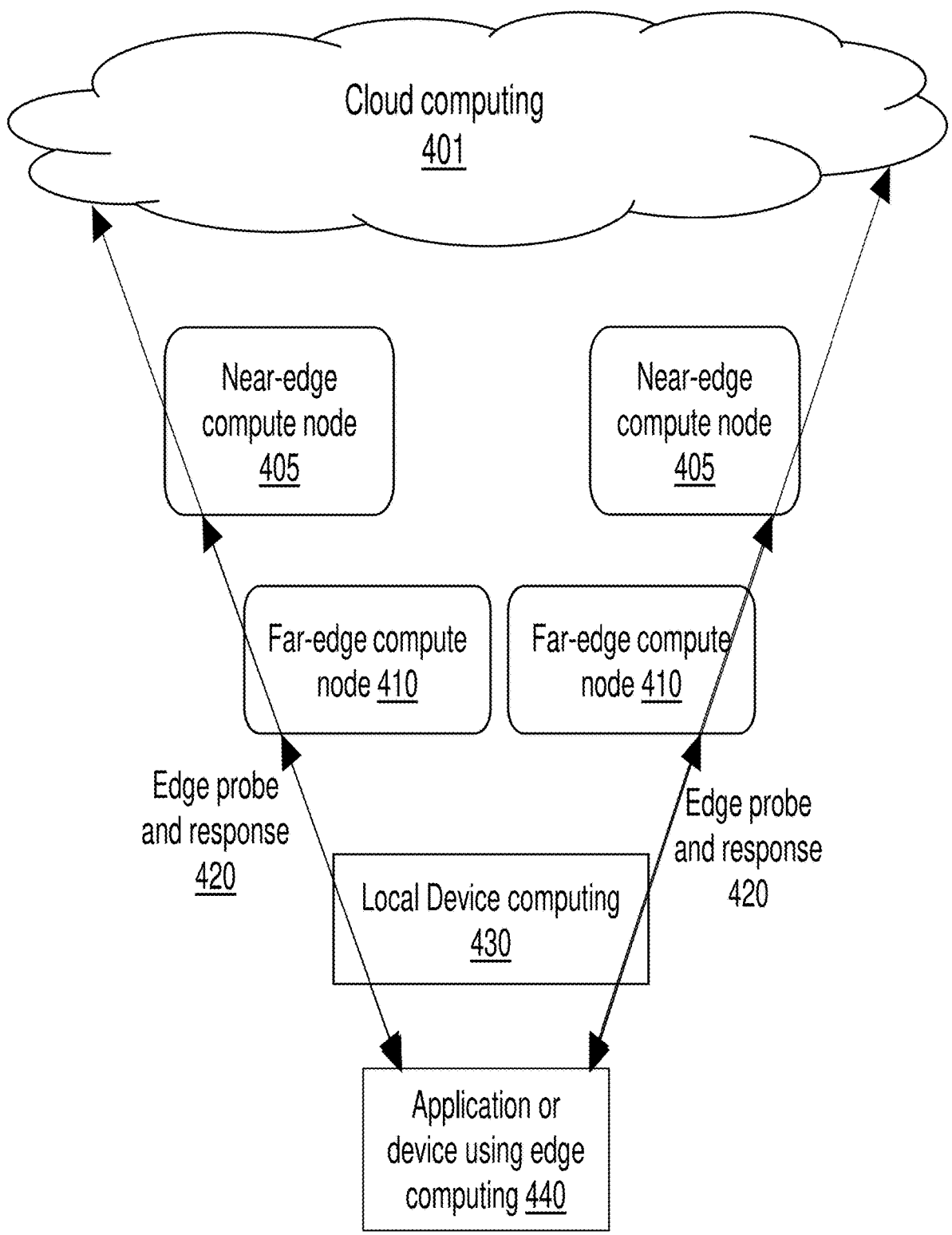
FIG. 4 shows edge probing with fog, cloud and edge computing according to various embodiments of the invention.

FIG. 4 contains a schematic illustration of embodiments where multiple edge probes support estimate of end-to-end performance can be accomplished as well as performance per network segment and per computation type according to various embodiments of the invention. For example, edge probes and responses may comprise any one or more of messages that run between the application or device using edge computing 440 and cloud computing 401, or between the application or device using edge computing 440 and a near-edge compute node 405, or between the application or device using edge computing 440 and a far-edge compute node 410, or between the application or device using edge computing 440 and a device supporting local device computing 430. Probes and responses may also run between and amongst different compute nodes and cloud computing.

The computing delays incurred by invoking multiple computing nodes, or multiple fog compute locations, and the networking delays incurred by accessing these can be estimated and used to calculate and compare distributed computing processing and networking delay time. Response results can provide time information that can be used for performance management and service assurance as well as for selecting computing nodes.

Related measures from other methods can be combined with edge probing for enhancing performance estimation. For example, a performance management system can provide further measures of network or computing performance for different edge compute nodes. In another example, a resource assignment system can provide information about scheduled or upcoming jobs that will use computing or networking resources at each edge compute node.

Edge Compute Node Selection

Edge probing responses can be used to determine assignments of applications or devices to edge compute nodes. An application using edge computing can use a the preferred edge compute node as determined by the edge probing responses. The edge node that has a low networking and computation delay, has sufficient available resources, and can support the application could be selected among the set of possible edge compute nodes that could be utilized. In addition, other measures such as determinism and reliability can be determined by edge probes and used to select the edge compute node to use.

An application or device can also be assigned multiple edge compute nodes according to various embodiments. In an exemplary embodiment, failover selection can be enabled by an edge probe. The probe can determine that the currently active node is inoperative, or is overloaded, and the results of additional probes can then be used to select an alternative edge compute node. In another embodiment, the selection of simultaneous use of multiple edge compute nodes can also be enabled with edge probing. Based on the results of one or more edge probes, a particular edge compute node can be assigned to perform a particular task, while another edge compute or cloud compute node can be assigned to another task.

Figure 6:
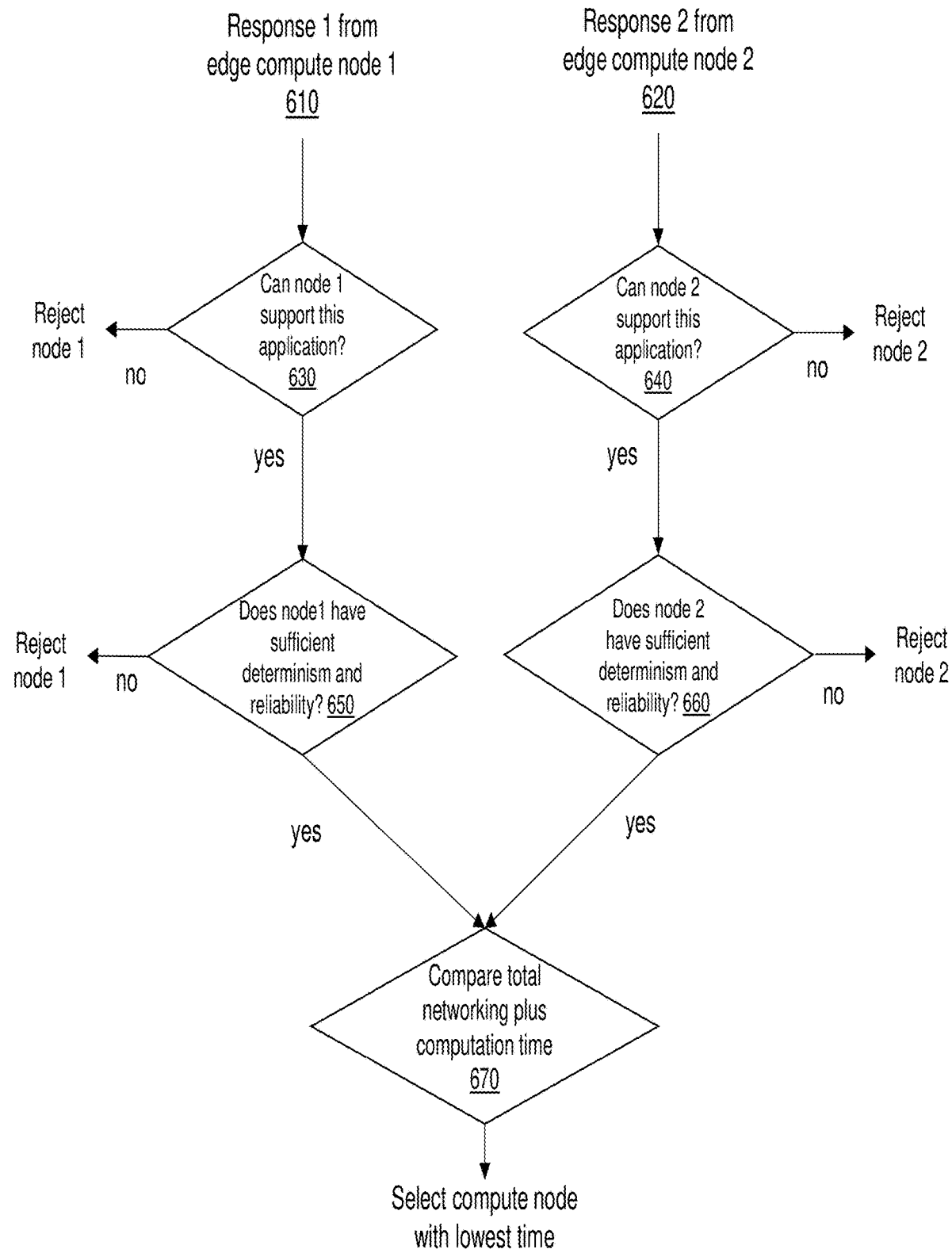
FIG. 6 shows a flow chart illustrating an example algorithm for compute node selection according to various embodiments of the invention.

FIG. 6 shows an example embodiment of an algorithm for selecting an edge compute node based on receiving edge probing responses. An application, device or system receives two edge probing responses: response 1 610 from edge compute node 1, and response 2 620 from edge compute node 2. These responses are for a particular application. First, the algorithm checks to see if edge compute node 1 can support the requested application 630), and if edge compute node 2 can support the requested application 640. If an edge compute node cannot support the application, then that node is rejected. Then, the algorithm ascertains if edge compute node 1 will have sufficient determinism and reliability for the application 650, and if edge compute node 2 will have sufficient determinism and reliability for the application 660. If an edge compute node does not have sufficient determinism and reliability for the application, then that node is rejected. Edge compute nodes that pass these two tests are then sent to the final decision at 670, where the total networking plus computation time is compared and the remaining edge compute node with the lowest total networking plus computation time is selected for use. This example may include an analysis of edge compute attributes other than determinism and reliability in 650, 660, that more than two edge compute nodes can be similarly evaluated, and that an aspect other than total networking plus computation time (such as estimated maximum expected computation time) can be compared in 670. Another alternative is to evaluate if a particular computing load can be supported in 630, 640.

In other embodiments, the determination as shown in the flow in FIG. 6 at 630, 640, 650, 660 to reject or accept or reject a node could occur in the application/device or in the edge compute node itself. For example, an edge compute node may determine the suitability for an application, and in response to determining that it supports the particular application, the edge compute node may take action itself. These actions may comprise any one or more of, but are not limited to, one of more of the following actions: sending a response to the edge probe comprising a message that the edge probe cannot provide the requested functionality, the edge compute node taking itself out of service and possibly sending a message to a management entity, the edge compute node requesting additional resources from a management entity, server, or human operator, the edge compute node refusing further requests for services from the requesting application or device and indicating this in the response message to the edge probe. In the case where the application/device makes the determination as to the edge compute node's suitability to perform a function, the response message comprises information that enables the device/application requesting the probe to make its determination. Those skilled in the art would realize that various combinations of these two cases, that is the edge node itself makes the determination and indicates in the response to the edge probe that it the edge compute node is suitable, or that the response comprises information that enables the device/application to determine suitability are possible to enable a determination to be made by the device/application with respect to the suitability of an edge compute node to perform a function or to be chosen by the application/device among a plurality of edge compute nodes. Another embodiment can be used to enhance operations such as fault, configuration, and provisioning using edge probes. Performance per network segment and per computation type can be compared for fault sectionalization, or to determine bottlenecks and sources of degradation. Locations with degrading edge probe response results can be identified for provisioning more computation or networking resources or an edge compute node can be instructed to download an application from a server on the cloud, or initialize the application based on an instruction given due to analysis of an edge probe. Network routing and switching can be configured for load balancing based on edge probe analysis. Analysis of trends in edge probe response can assist in network planning. Analysis of edge probes can assist in the placement of new node locations and new computation resources can be installed or enabled.

A control or orchestration system can input edge probing results for multiple devices or applications, and then assign each device or application to an edge compute node. This system can arbitrate among multiple edge compute requests and jointly assign edge computing among multiple devices or applications. Cloud computing can be assigned for parts of the application that are more delay sensitive, such as analyzing long-term historical trends. Compute node selection can also be guided by policy.

In various embodiments, a machine learning (ML) or artificial intelligence (AI) loop can be applied to analyze the edge probing data, the probing frequency can be increased with more frequent probes if performance fluctuates or if there are faults or performance loss. Machine learning can determine which parameters are most useful for applications. The frequency of occurrence of edge probing can be adaptively determined over time to get the best trade-off of probing accuracy vs. the amount of resources used up by probing. For example, if edge probe responses indicate that computing times are changing more rapidly, then edge probes can be issued more frequently; or if the computing times are changing less rapidly, then edge probes can be issued less frequently. As another example, longer or shorter test computations can be performed.

Extended Computing Architectures

Edge probing can also be used for computing systems other than pure edge computing in accordance with various embodiments. For example, edge probes can be used in cloud or fog computing. Computations requiring very rapid response can be performed in the edge, with more delay tolerant computations performed in the cloud. Edge probing can verify and select both edge and cloud computing. Fog computing can be used to assist cloud computing.

FIG. 4 shows edge probing used with fog computing or edge-cloud computing according to various embodiments. Edge probes and responses 420 flow between any two endpoints, including an application using edge computing 440, a local device with computing 430, far-edge compute node(s) 405, near-edge compute node(s) 410, and cloud computing 401. Probes 420 may be issued between the various compute levels, or a probe 420 can be issued end-to-end. The responses are compared to determine which compute nodes to use. Different nodes may be used for different purposes within an application, for example the far-edge compute node 410 may perform an ML algorithm, while the near-edge compute node 405 or cloud 401 may adapt the ML model.

Fog computing distributes computing functionality across multiple layers, with rapid computing responses at the network edge and longer response time deeper in the network and cloud. For example, computing can be in a local device (called device computing), computing can be in the far edge (also called the network/access edge, or Radio Access Network (RAN) edge), computing can be in the near edge (also called the metro edge), and computing can be in the Cloud. The near-edge or far-edge can be associated with a Cloud Central Office (CloudCO), Broadband Forum TR-384, Cloud Central Office (CloudCO) Reference Architectural Framework, 2018, or other specifications known to one of skill in the art.

In certain examples, fog computation can even be further stratified, for example to include a personal area network (PAN), e.g., from a watch and sensors to a smartphone. In other examples, a Cloudlet may be between the cloud and the edge computing. Edge probing can run among all these computing layers. Multiple paths (wired and wireless) to multiple edge compute nodes can be probed, and many networking paths and computing nodes can be woven together in an efficient manner using the responses using the probe responses. The performance of computing that is distributed across multiple systems can be measured.

In an example embodiment, as the edge probe traverses in FIG. 4 from the application or device 440 using edge computing up to cloud computing 401, the following timestamps can be appended to the edge probe as described in this example embodiment. A first timestamp is appended by the application or device 440 and is the time at which the edge probe exits the device 440. A second timestamp is appended by the local computing device 430 and is the time at which the edge probe enters the local computing device 430. A third timestamp is appended by the local computing device 430 and is the time at which the edge probe exits the local computing device 430. A fourth timestamp is appended by the far-edge compute node 410 and is the time at which the edge probe enters the far-edge compute node 410. A fifth timestamp is appended by the far-edge compute node 410 and is the time at which the edge probe exits the far-edge compute node 410. A sixth timestamp is appended by the near-edge compute node 405 and is the time at which the edge probe enters the near-edge compute node 405. A seventh timestamp is appended by the near-edge compute node 405 and is the time at which the edge probe exits the near-edge compute node 405. An eighth timestamp is appended by cloud computing 401 and is the time at which the edge probe enters cloud computing 401. Any or all of these timestamps can be included in the edge probe response. Also, some compute nodes or timestamps may be omitted.

Ninth and successive timestamps can be added to the response as the edge probe traverses from cloud computing 401 back down to the application or device using edge computing 440. These timestamps in the edge probe and in the response can be compared to determine the time taken to traverse from application to a compute node in FIG. 4, similar round-trip times, the time taken by computing in single or multiple compute nodes in FIG. 4, network traversal times, multiple network and computing times, etc. These different timestamps not only provide flexibility in the system's ability to calculate time information, that is delay and latency, but also identify bottlenecks within the network to enable latency mapping at a link-to-link granularity, which may be used in future analysis of which edge compute nodes to use.

Network ping(s) or traceroute(s) can determine networking times and then be used with these timestamps to determine times used by compute node(s). Peer to peer networking and computing involves accessing other users' compute resources. Edge probing can be run to peering nodes, measuring both network and compute performance. Multiple peering nodes can be probed, and probing can involve peer-to-peer networking such as BitTorrent.

Network and Applications

Edge probing can be applied across many types of networks, which may comprise any one or more of Local Area Networks (LAN), metro networks, or Wide Area Networks (WAN). Edge probing can be used for application which may comprise any one or more of broadband access systems using copper, fiber, coax, fixed wireless, powerline communications, Wi-Fi, cellular, or other wireless communications. Edge probing can be done with access nodes may comprise any one or more of Digital Subscriber Line Access Multiplexers (DSLAMs), Optical Line terminals (OLTs), Ethernet switches, Cable Modem Termination Systems (CMTS), Cellular gateways, or similar. Edge probing can measure the broadband aggregation network or core network, and flow to and through switches and routers. Any type of device can have an application that accesses edge computing and uses edge probing.

The aggregation network can connect to edge compute nodes and the aggregation network may comprise any one or more of Ethernet-based backhaul, IP-based backhaul, fiber-based backhaul, copper-based backhaul, coax-based backhaul, powerline communications, Broadband Network Gateway (BNG), Broadband Remote Access Server (BRAS), aggregation nodes, backhaul, switches, routers, and Fixed Mobile Interworking Function (FMIF).

Edge probing can be used by in many applications and environments by many different types of users. Examples of such users of edge probing may comprise any one or more of: network operators and service providers; providers of apps for smart phones or tablets, network providers; providers of Digital Subscriber Lines (DSL), active Ethernet, optical access, passive optical networks (PON), coaxial cable, cable modem, fixed wireless, cellular, 4G/5G/6G, Wi-Fi, or powerline communications, and within Edge probing can evaluate performances of different network slices. Private MEC or Public MEC can be evaluated by edge computing.

Examples of edge computing applications using edge probing may comprise any one or more of: Enterprise (Cloud & Network Services), Industrial automation, Manufacturing, Healthcare, Energy, Mining, Transportation, Ports, Manufacturing, AI Virtual Assistant, Public safety, Connected cars, Autonomous vehicles, Vehicle to Everything (V2X), In-flight, Tele-operations, Remote surgery, Augmented Reality (AR), Virtual Reality (VR), Internet of Things (IoT), Smart cities, Gaming, Pattern recognition, Facial recognition, Crowd, Surveillance and Security Services, and Financial transactions. AI analyses such as pattern recognition are often suitable for edge computing and edge probing. Also, applications such as traffic control, autonomous vehicles, or industrial applications that require very low latency are particularly suitable for edge computing and edge probing.

Additional examples of edge computing applications may comprise any one or more of but are not limited to: computation offloading, virtual healthcare, video rendering, smart industry, home automation, translation services, speech recognition, video recognition, high frequency financial trading applications, point of sale retail applications, logistics and freight handling, transportation (e.g. railroad and aviation) dispatch and management, commercial and home HVAC management, power distribution grid and generation management, targeted advertising, smart speakers, video conferencing, smart grid, remote monitoring, home and business security, fire prevention, industrial process control, biomedical monitoring, air traffic control, military battle field applications, scientific research (e.g. control of accelerators or remote telescopes), automated farming, telecom operations administration and management (OA&M), municipal water system management, management of public transit systems, video orchestration, distributed database, distributed computing, ML and AI training and operation, IoT gateways, gaming, network functions, and virtual desktop.

We claim:

1. A method of probing edge computing performance, comprising:
    generating a plurality of edge probes that facilitate generation of time information related to a plurality of edge compute nodes;
    transmitting, from a transmitter, a first edge probe among the plurality of edge probes to a first edge compute node and transmitting a second edge probe among the plurality of edge probes to a second edge compute node, the first and second edge compute nodes being in the plurality of edge compute nodes;
    receiving, at a receiver, from the first edge compute node a first response corresponding to the first edge probe and receiving from the first edge compute node a second response corresponding to the second edge probe, the first response comprises network time information of the first edge compute node and edge node compute time information of the first edge compute node, the second response comprises network time information of the second edge compute node and edge node compute time information of the second edge compute node, the edge node compute time information is related to time due to computations occurred within the first or second edge compute node; and
    selecting a preferred edge compute node based at least in part on time information derived from the first and second responses, the preferred edge compute node being within the plurality of edge compute nodes.

2. The method of claim 1 wherein each of the plurality of edge probes specifies one or more edge computing tests for an edge compute node.

3. The method of claim 1 wherein the time information is a measure or estimate of time delay.

4. The method of claim 1 wherein the first or second response from the first or second edge compute node includes a timestamp.

5. The method of claim 1 wherein a computation is performed, with a computation time delay being part of a round-trip response delay.

6. The method of claim 1 wherein a networking delay is further estimated by networking tests.

7. The method of claim 1 wherein the computation is designed to provide uniformly comparable computing times that enable comparisons between performances of the first and the second edge compute nodes.

8. The method of claim 1 wherein the first and the second edge probes and their responses are used to estimate one or more of speed, latency, jitter, statistical distributions, averages, statistics, loss, availability, reliability, repeatability, throughput, scalability, privacy, security, efficiency, computing speed, computing time, determinacy, repeatability, scalability, throughput, CPU, graphics, memory, disk, or network performance of the first edge compute node and the second edge compute node.

9. A network device comprising:
    an edge probe generator that generates a plurality of edge probes that facilitate generation of time information related to a plurality of edge compute nodes;
    a transmitter coupled to the edge probe generator, the transmitter transmits a first edge probe among the plurality of edge probes to a first edge compute node and transmits a second edge probe among the plurality of edge probes to a second edge compute node, the first and second edge compute nodes being in the plurality of edge compute nodes;
    a receiver that receives from the first edge compute node a first response corresponding to the first edge probe and receives from the second edge compute node a second response corresponding to the second edge probe, the first response comprises network time information and edge node compute time information of the first edge compute node, the second response comprises network time information and edge node compute time information of the second edge compute node, the edge node compute time information is related to time due to computations occurred within the first or second edge compute node; and
    an edge compute node selector that selects a preferred edge compute node based at least in part on time information derived from the first and second responses, the preferred edge compute node being within the plurality of edge compute nodes.

10. The network device of claim 9 wherein each one of the plurality of edge probes specifies one or more edge computing tests for an edge compute node.

11. The network device of claim 9 wherein the edge node compute time information at the first edge compute node and the edge node compute time information at the second edge compute node correlate to one or more performance characteristics of the first and second edge compute nodes relative to a particular type of application.

12. The network device of claim 9 wherein the preferred edge compute node is selected by determining which edge compute node within the plurality of edge compute nodes has desired time information.

13. The network device of claim 12 wherein the desired time information is the shortest latency or delay.

14. The network device of claim 9 wherein the preferred edge compute node is selected by determining which edge compute node within the plurality of edge compute nodes provides a highest performance associated with a particular application.

15. The network device of claim 14 wherein the preferred edge compute node is selected based on at least one of an estimation of jitter, computed statistical distributions related to performance, calculated averages related to performance and measured determinism of computation times.

* * * * *